United States Patent
Shan et al.

(10) Patent No.: US 11,715,456 B2
(45) Date of Patent: Aug. 1, 2023

(54) SERIAL FFT-BASED LOW-POWER MFCC SPEECH FEATURE EXTRACTION CIRCUIT

(71) Applicant: SOUTHEAST UNIVERSITY, Nanjing (CN)

(72) Inventors: Weiwei Shan, Nanjing (CN); Lixuan Zhu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 159 days.

(21) Appl. No.: 17/112,246

(22) Filed: Dec. 4, 2020

(65) Prior Publication Data

US 2021/0090553 A1 Mar. 25, 2021

(30) Foreign Application Priority Data

Jan. 10, 2020 (CN) .......................... 202010026164.7

(51) Int. Cl.
 *G06F 17/14* (2006.01)
 *G10L 15/02* (2006.01)
 *G10L 25/27* (2013.01)
 *G10L 25/45* (2013.01)

(52) U.S. Cl.
 CPC ............ *G10L 15/02* (2013.01); *G06F 17/141* (2013.01); *G10L 25/27* (2013.01); *G10L 25/45* (2013.01)

(58) Field of Classification Search
 CPC ....... G06F 17/141; G10L 15/02; G10L 25/27; G10L 25/45
 See application file for complete search history.

(56) References Cited

U.S. PATENT DOCUMENTS

| 4,868,776 A | * | 9/1989 | Gray | ...................... G06F 17/142 |
| | | | | 708/405 |
| 11,221,397 B2 | * | 1/2022 | Gupta | ................... G06F 17/142 |

(Continued)

OTHER PUBLICATIONS

W. Liu, Q. Liao, F. Qiao, W. Xia, C. Wang and F. Lombardi, "Approximate Designs for Fast Fourier Transform (FFT) With Application to Speech Recognition," in IEEE Transactions on Circuits and Systems I: Regular Papers, vol. 66, No. 12, pp. 4727-4739, Dec. 2019 (Year: 2019).*

(Continued)

*Primary Examiner* — Bhavesh M Mehta
*Assistant Examiner* — Nandini Subramani
(74) *Attorney, Agent, or Firm* — CBM Patent Consulting, LLC

(57) ABSTRACT

It discloses a serial FFT-based low-power MFCC speech feature extraction circuit, and belongs to the technical field of calculation, reckoning or counting. The circuit is oriented toward the field of intelligence, and is adapted to a hardware circuit design by optimizing an MFCC algorithm, and a serial FFT algorithm and an approximation operation on a multiplication are fully used, thereby greatly reducing a circuit area and power. The entire circuit includes a preprocessing module, a framing and windowing module, an FFT module, a Mel filtration module, and a logarithm and DCT module. The improved FFT algorithm uses a serial pipeline manner to process data, and a time of an audio frame is effectively utilized, thereby reducing a storage area and operation frequency of the circuit under the condition of meeting an output requirement.

5 Claims, 6 Drawing Sheets

(56) References Cited

U.S. PATENT DOCUMENTS

| | | | | |
|---|---|---|---|---|
| 2006/0167964 | A1* | 7/2006 | Balakrishnan | G06F 17/142 708/404 |
| 2008/0071848 | A1* | 3/2008 | Baireddy | G06F 17/142 708/404 |
| 2017/0149589 | A1* | 5/2017 | Kim | G06F 17/142 |
| 2019/0384803 | A1* | 12/2019 | Lee | G06F 17/141 |

OTHER PUBLICATIONS

J. S. P. Giraldo, S. Lauwereins, K. Badami, H. Van Hamme and M. Verheist, "18μW SoC for near-microphone Keyword Spotting and Speaker Verification," 2019 Symposium on VLSI Circuits, 2019, pp. C52-C53 (Year: 2019).*

Këpuska, V. Z., Eljhani, M. M., & Hight, B. H. (2013). Front-end of Wake-Up-Word Speech Recognition System Design on FPGA. J Telecommun Syst Manage 2: 108. (Year: 2013).*

V. B. Saambhavi, S. S. S. P. Rao and P. Rajalakshmi, "Design of feature extraction circuit for speech recognition applications," TENCON 2012 IEEE Region 10 Conference, 2012, pp. 1-5. (Year: 2012).*

\* cited by examiner

SERIAL FFT-BASED LOW-POWER MFCC SPEECH FEATURE EXTRACTION CIRCUIT

This application claims priority to Chinese Patent Application Ser. No. CN202010026164.7 filed on 10 Jan. 2020.

FIELD OF TECHNOLOGY

The present invention discloses a serial FFT-based low-power MFCC speech feature extraction circuit, relates to the field of speech feature signal processing and integrated circuit design, and belongs to the technical field of calculation, reckoning or counting.

BACKGROUND

With gradual development of intelligence in the current age, speech interaction becomes increasingly important in the intelligent field, speech interaction devices start to play an important role in our life, for example, a speech assistant of a smart phone, an access control system, a vehicle-mounted system, etc. The key of speech interaction is speech recognition, speech feature extraction is the key of speech recognition, and the recognition accuracy of the speech recognition system can be effectively improved by realizing low-loss extraction of the audio feature signal with low power.

At present, a conventional speech feature extraction algorithm includes Dynamic Time Warping (DTW), Linear Predictive Coding (LPC), Mel-frequency Cepstral Coefficients (MFCC) analysis, etc., wherein the MFCC analysis is better in performance and extraction accuracy. This algorithm performs preprocessing, framing, windowing, Fast Fourier Transform (FFT), Mel logarithm operation and Discrete Cosine Transform (DCT) on an audio to finally obtain a result of the audio, but a conventional MFCC algorithm has poor adaptability to hardware, and an FFT operation process and a large amount of multiply-accumulate operations and storage areas needed by a Mel filtration operation increase the implementation difficulty and cost of the hardware. Furthermore, due to the fact that the intelligent devices have the limitation of power supply and endurance and the conventional speech extraction algorithm is not suitable for the use of the current intelligent devices any more, the present invention designs an MFCC speech feature extraction circuit, the FFT and Mel filtration algorithm architecture and a multiply-accumulate mode of the preprocessing module are optimized, which greatly reduces the operation amount and the memory space of the speech feature extraction circuit and makes the same to be more adaptive to low-power requirements of the intelligent devices.

SUMMARY

In view of the defects of the background art mentioned above, the objective of the present invention is to provide a serial FFT-based low-power MFCC speech feature extraction circuit, in a low-power MFCC circuit architecture, a multiply-accumulate operation mode is optimized, and a serial FFT algorithm and an optimized Mel filtration architecture are used, such that a speed is reduced to a certain degree to greatly reduce an area and power of the circuit, then the problems of high power and large memory space of the speech feature extraction algorithm in terms of hardware are solved.

For achieving the above objective, the present invention uses the following technical solution:

The serial FFT-based low-power MFCC speech feature extraction circuit includes: a preprocessing module, a framing and windowing module, a FFT module, a Mel filtration module, a logarithm and DCT module; and The preprocessing module is functionally equal to a high-pass filter, and the module guarantees a signal-to-noise ratio of a single on a frequency spectrum and reduces the attenuation of a high-frequency part of a human voice. The specific operation of the preprocessing module on a speech sequence input serially includes subtracting the previous data of the adjacent time in the speech sequence from input data and accumulating a value obtained by shifting the previous data rightwards by 4 bits, so as to acquire a pre-emphasis speech signal.

The framing and windowing module has a function of cutting a long audio into several frames and sending the same to the subsequent modules to be processed. Data of every t (t is a decimal and ranges from 20 to 40 usually) milliseconds of the input speech sequence are taken as one frame, the data point number (the data point number equals a frame size multiplied by a sampling rate) of one frame is T (T is an integer, and for meeting the subsequent FFT module, T equals 2 to the power of N usually), data accuracy is A bit (A is an integer greater than 1), overlap between frames is s (s is a decimal and is half of t usually) milliseconds, and the point number of the overlap part is S (S is an integer and is half of T usually). Due to overlap data between two adjacent frames, the data of the overlap part of the adjacent frames need to be stored by an S*A-bit static random access memory for use in the next frame, and output of the module can be acquired by multiplying the data of each frame by a Hamming window function value stored in a read-only memory.

The FFT module has a function of converting a time-domain signal of one frame into a frequency-domain signal. The FFT module is composed of N/2 (N is an exponential term of 2 in T mentioned above) radix-$2^2$ single delay feedback (Radix-$2^2$SDF for short) units, and each Radix-$2^2$SDF unit includes two butterfly operations and one multiply operation with a twiddle factor, wherein the butterfly operation is to perform cross addition and subtraction on two input real numbers to obtain a set of new real numbers, and the twiddle factor is prestored in the read-only memory. The data output by the framing and windowing module serially flow into the FFT module in a natural sequence and are subjected to operations by the N/2 Radix-$2^2$SDF units, and finally the data are sequentially output in a sequence of bit permutation (bit flip is flip between a high bit and a symmetrical low bit).

The Mel filtration module has a function of performing a Mel filtration operation on the frequency-domain signal of each frame. The specific operation includes steps that firstly the real-part and imaginary-part data output by the FFT module are subjected a sum-of-squares operation to obtain an energy value of a frequency domain, then the energy value is multiplied by a function value, prestored in the static random access memory, of an M-stage Mel filtration set (M is an integer ranging from 20 to 40 usually), the multiplied value of the whole frame of signal is accumulated, and finally each frame acquires M Mel values.

The logarithm and DCT module has a function of performing compressed representation on the data of the filter sets mentioned above. Firstly a logarithm value with 2 as a base is taken on the M Mel values through a lookup table (a position in which the highest bit "1" of input data bits appears is searched to find a corresponding logarithm value), and then DCT is performed. DCT is specifically achieved by multiplying the input data and a cosine coefficient and then performing accumulative computing, wherein the cosine coefficient is stored in the read-only memory, finally an L-stage DCT result is output (L is an integer usually less than M), and the result is a feature value output by the circuit.

Based on a further optimization scheme of the serial FFT-based low-power MFCC speech feature extraction circuit, in the pre-emphasis module, an original equation is replaced with an optimization equation below, wherein $data_{in}$ and $data_{out}$ are input data and output data of this operation respectively, and k is a position of the data and starts from 1:

$$data_{out}[k] = \begin{cases} data_{in}[k] & k = 1 \\ data_{in}[k] - u*data_{in}[k-1] & k > 1 \end{cases} \text{(original equation)}$$

u is usually 0.95, $data_{out}[k] =$ (optimized equation)

$data_{in}[k] - data_{in}[k-1] + data_{in}[k-1] \gg 4$,

Finally the multiply-accumulate operation of the original mathematical equation are optimized to be a shift and add operation, such that extra power and memory space during an on-chip system achieves the multiplication are reduced.

As the further optimization scheme of the serial FFT-based low-power MFCC speech feature extraction circuit, a serial-pipeline FFT algorithm is used for achieving the Fourier transform. The algorithm achieves Fourier transform of time-domain data layer by layer by means of the radix-$2^2$ single delay feedback units connected in series, thereby greatly reducing the area and power of the circuit under the condition of sacrificing the throughput and speed to a certain degree. The specific process of the algorithm is:

Step 1: firstly, a first butterfly operation (BF1 for short) part in the first Radix-$2^2$SDF operation unit includes a memory of T/2*A bits, in input T data of one frame, the first datum to the T/2-th datum serve as a first data set, the (T/2+1)th datum to the T-th datum serve as a second data set, the first data set is stored in the memory in sequence, then the coming second data set and the first data set stored in the memory are subjected to the first butterfly operation in sequence, a set of data with a T length is obtained after the first butterfly operation, due to the fact that a next butterfly operation (BF2 for short) part only processes T/2 data, the last T/2 data in the T data output by the BF1 are firstly returned and stored in the memory with a T/2 length in the BF1 so as to replace the first data set stored before, then the first T/2 data in the T data output by the BF1 are sent into the BF2 for butterfly operation, similarly, the BF2 uses the same data processing mode as the BF1 to achieve butterfly operation, and after the BF2 completes the butterfly operation of the first T/2 data in the T data output by the BF1, the T/2 data, of the first set, stored in the memory in the BF1 are sent into the BF2 for butterfly operation.

Step 2: the BF2 part in the first Radix-$2^2$SDF operation unit includes a memory of T/4*A bits, in the T/2 data output by the BF1 part, firstly the first T/4 data are stored in the memory of the BF2, like the BF1 part, the coming last T/4 data and the stored first T/4 data are subjected to the second butterfly operation, then the second data set of a second butterfly operation result is returned to update the memory of T/4*A bits, the first data set of the second butterfly operation result are output to the multiplying unit, the second butterfly operation result is multiplied by the twiddle factor by means of the multiplying unit to obtain a first-layer Fourier transform result, the value of the twiddle factor is stored in a memory of T/4*A bits, and the twiddle factor product units in all of the Radix-$2^2$SDF units may call the value in the same memory.

Step 3: the following each Radix-$2^2$SDF still repeats the above operations, a size of a memory corresponding to a butterfly operation module in each Radix-$2^2$SDF unit is reduced one by one, until a size a memory of a BF1 of the N/2-th Radix-$2^2$SDF unit is 2*A bits, a BF2 directly outputs complex results of the FFT module, final data flow out in a sequence of bit permutation, and due to the fact that after the Mel filtration, the data of the whole frame are subjected to multiplying, adding and summing, a sequence does not influence the result, and the module does not adjust the sequence, such that the hardware consumption of a control logic part can be saved.

As the further optimization scheme of the serial FFT-based low-power MFCC speech feature extraction circuit, in the logarithm taking module, a logarithm operation is achieved through the lookup table, and the logarithm operation may not use a conventional Coordinate Rotation Digital Calculation method (CORDIC) for operation, but searches the position in which the highest bit "1" of input data bits appears so as to find the corresponding logarithm value.

The present invention uses the above-mentioned technical solution and has the following beneficial effects:

(1) the present invention optimizes the FFT and a Mel filtration algorithm architecture, thereby effectively extracting a feature value of the audio by means of a small-area and small-storage hardware circuit, a memory space of the FFT achieved in a serial manner is reduced to 1/N (N is an exponential term of T, and T is the point number of one frame, that is, the input data size of one frame of the FFT and is 2 to the power of N usually) that of the FFT achieved in a parallel manner, and the computing amount is dramatically reduced.

(2) An optimization logarithm taking mode of the lookup table is used, such that the complexity of the logarithm operation is relieved, and the power is reduced.

(3) The multiplication is subjected to approximation operation processing in the preprocessing module, and the multiply operation is replaced with a shift operation, such that the power of the operation is reduced.

DESCRIPTION OF THE EMBODIMENTS

Figure 1:
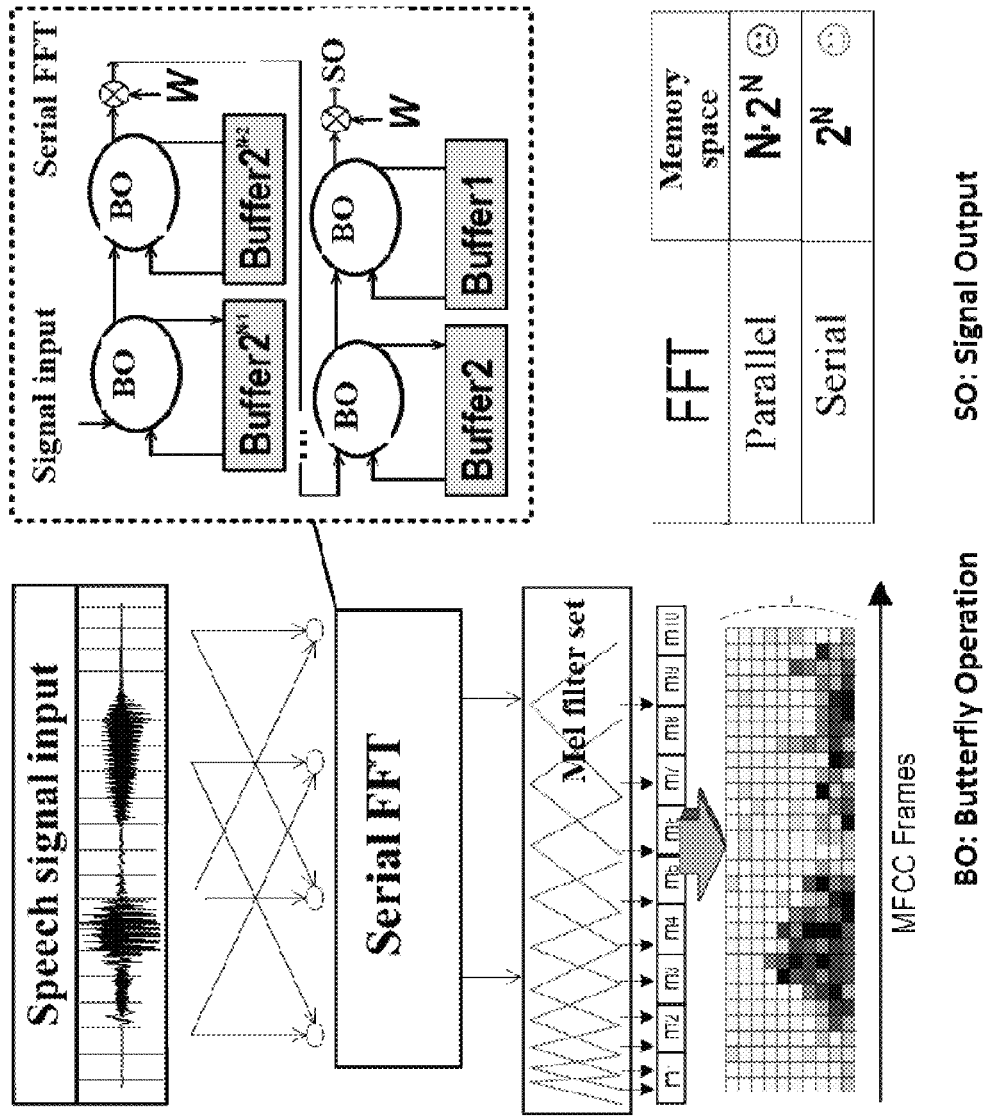
FIG. 1 is a schematic diagram of the present invention.

The technical solution of the present invention will be described in detail below with reference to the accompanying drawings, an example having a frame size being 256 points, a step size being 128 points, a 20-stage Mel value and a 10-stage DCT value (T=256, S=128, M=20, L=10) is taken to explain the specific implementation of the present invention but does not limit the scope of the present invention. FIG. 1 is a schematic diagram of the present invention.

Figure 2:
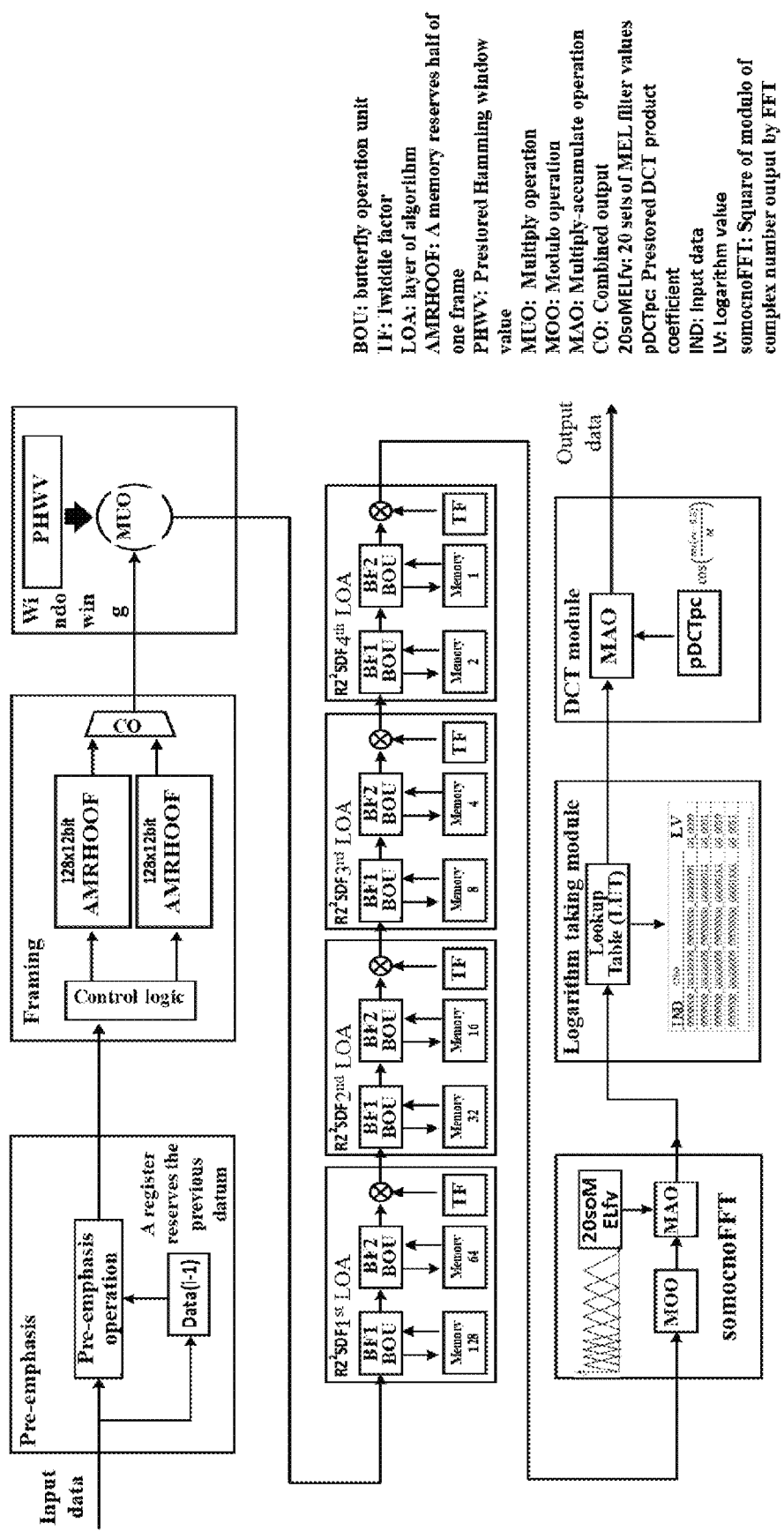
FIG. 2 is a system architecture diagram of the present invention.

As shown in FIG. 2, a serial FFT-based low-power MFCC speech feature extraction circuit designed by the present invention is mainly divided into four modules: a framing and windowing module, an FFT module, a Mel filtration module, and a logarithm and DCT module. The circuit inputs a clock signal and a speech analog-to-digital conversion (ADC) sampling data signal and outputs a speech feature value, and the work of the circuit includes the following steps.

Figure 3:
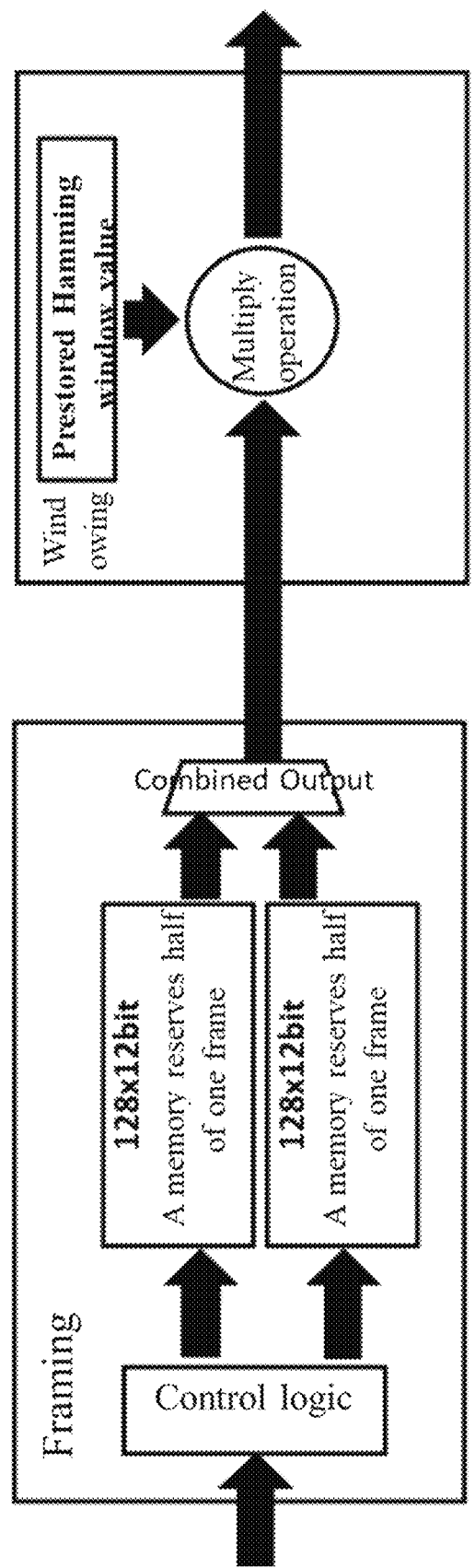
FIG. 3 is a structure diagram of a framing and windowing module circuit of the present invention.

Step 1: as shown in FIG. 3, starting from circuit switching on, a speech ADC sampling end samples an audio at a sampling rate of 8K, the system firstly needs to use an asynchronous first-in first-out memory (FIFO) to cache data, data output of the asynchronous FIFO serves as input of a pre-emphasis module, and the data enter the module and then achieve an pre-emphasis operation by means of a register and shift and add operations. An equation of the pre-emphasis operation is as follows:

$$data_{out}[k]=data_{in}[k]-data_{in}[k-1]+data_{in}[k-1]\gg 4,$$

wherein k starts from 1 and presents a position of the data.

Step 2: a framing operation in the framing and windowing module does not operate the data but cuts, recombines and outputs the data, such that only one memory and one multiplexer may achieve framing of the data, and the second half of the previous frame of data is stored every time. The data subjected to framing is multiplied by a coefficient with a stored Hamming window by means of a multiplying unit.

Figure 4:
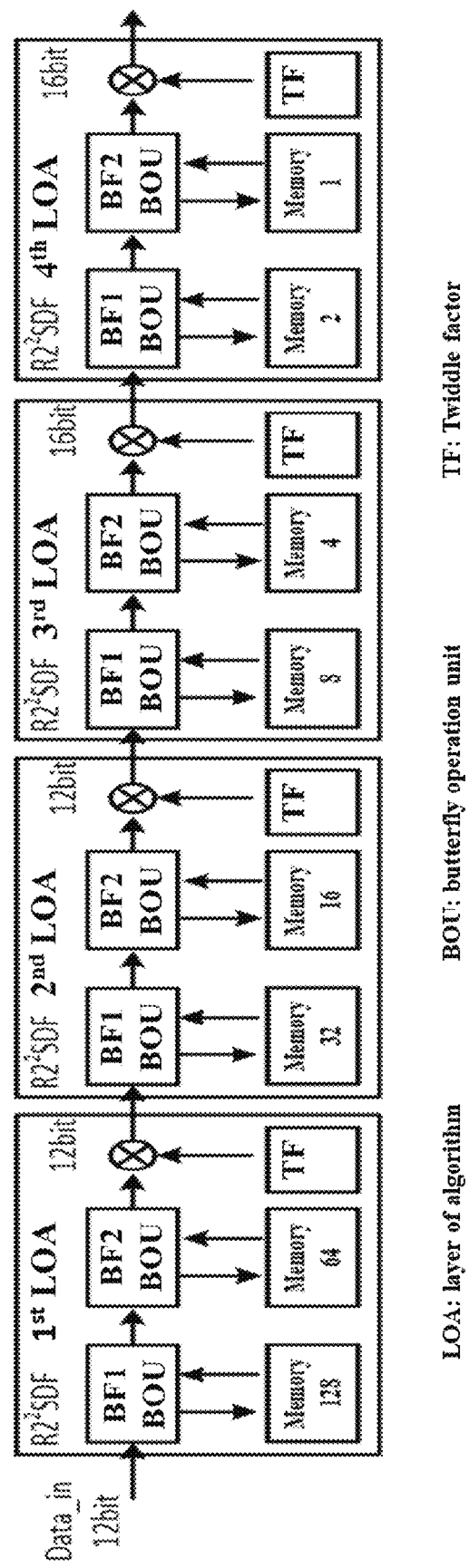
FIG. 4 is a structure diagram of an FFT module circuit of the present invention.

Step 3: as shown in FIG. 4, the data subjected to framing and windowing enter the FFT module in a pipeline manner. Firstly, due to the fact that the point number of the Fourier transform is 256, 4-stage Radix-$2^2$SDF units are needed, each Radix-$2^2$SDF unit includes a BF1 operation unit, a BF2 operation unit and a twiddle factor multiplication unit, and an operational equation of the serial FFT module is as follows:

$$(k_1+2k_2+4k_3)=\sum_{n_3=0}^{\frac{N}{4}-1}\left\{\left[x(n_3)+(-1)^{k_1}x\left(\frac{N}{2}+n_3\right)\right]+(-j)^{(k_1+2k_2)}\left[x\left(\frac{N}{4}+n_3\right)+(-1)^{k_1}x\left(\frac{3N}{4}+n_3\right)\right]\right\}W_N^{n_3(k_1+2k_2)}W_{\frac{N}{4}}^{n_3k_3},$$

in the above equation, $(k_1+2k_2+4k_3)$ is a sequence of the output signals, $k_1$ is 0, 1, k2 is 0, 1, and k3 is an integer number ranging from 0 to 63. In a part, on the right side of the equal sign, of the equation, an equation in a summation sign has an actual meaning of a mathematical processing of the butterfly operation. $x(n_3)+(-1)^{k_1}x(N/2+n_3)$ serves as the BF1 butterfly operation, $\{[x(n_3)+(-1)^{k_1}x(N/2+n_3)]+(-j)^{(k_1+2k_2)}[x(N/4+n_3)+(-1)^{k_1}x(3N/4+n_3)]\}$ serves as the BF2 butterfly operation, and $W_n^{n_3(k_1+2k_2)}$ serves as the twiddle factor. The data are subjected to 4 rounds of operations of the Radix-$2^2$SDF units, and finally FFT results are output in a sequence of bit permutation.

Figure 5:
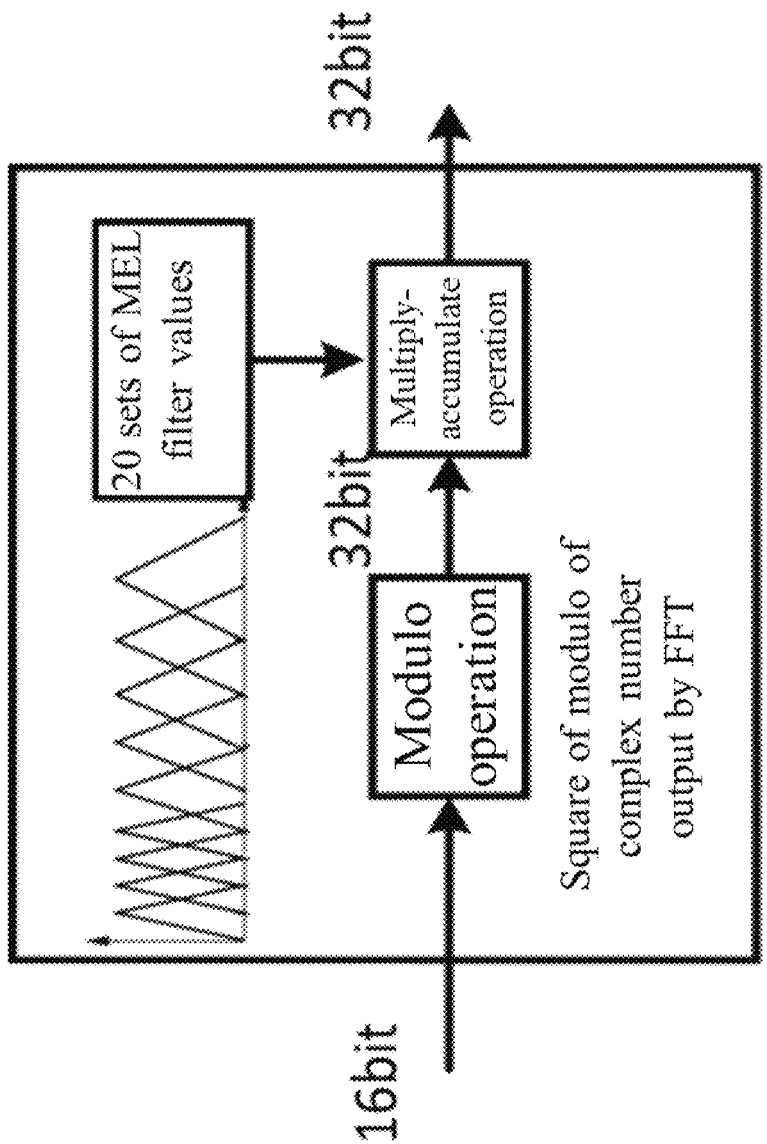
FIG. 5 is a structure diagram of a Mel filtration module circuit of the present invention.

Step 4: as shown in FIG. 5, a complex output by the FFT is firstly subjected to real-part imaginary-part sum-of-squares operation, an output modulo value and a function value stored in a Mel filter of the memory are subjected to multiplying and accumulation, and finally the 20-stage Mel value of one frame is output.

Figure 6:
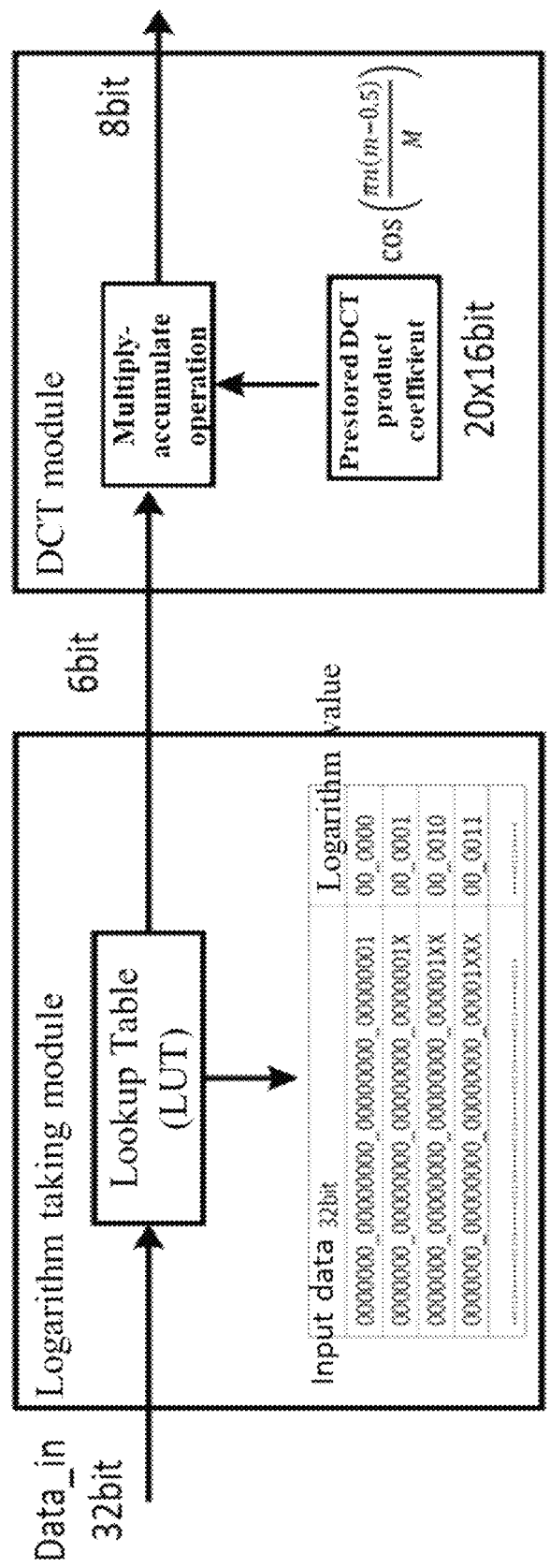
FIG. 6 is a structure diagram of circuits of a logarithm and DCT module of the present invention.

Step 5: as shown in FIG. 6, after the Mel value is output, logarithm taking on the same is needed, a position in which the highest bit '1' of the data bits appears is searched to achieve the function through a lookup table, for example, in an eight-bit binary number 10001111, the position in which the highest bit '1' thereof appears is the 7th bit, such that a corresponding logarithm value is 7. After logarithm taking, the Mel value needs to be subjected to DCT, and an equation of the DCT is as follows:

$$C(x)=\sum_{m=0}^{M-1}s(m)\cos\left(\frac{\pi x(m-0.5)}{M}\right),x=1,2,\ldots,L,$$

s(m) is the logarithm value of the Mel value with 2 as a base, L is the stage number of the DCT, M is the stage number of Mel, the equation may finally output the 10-stage DCT value by multiplying, accumulating and calculating the data and a corresponding cosine value on the hardware, and the 10-stage DCT value serves as a feature value of the frame.

What is claimed is:

1. A serial FFT-based low-power MFCC speech feature extraction circuit, comprising:

a pre-emphasis module that is a software component for preprocessing an input speech sequence by subtracting previous data of an adjacent time from input data and accumulating a value obtained by shifting previous data rightwards by 4 bits;

a framing and windowing module that is a software component for performing framing and windowing operations on the pre-processed speech sequence by cutting a long audio into several frames;

an FFT module that is a software component for— converting a time-domain signal of one frame into a frequency-domain signal by performing Fourier transform layer by layer and packet by packet on the sequence data subjected to framing and windowing operations and then outputting complex data subjected to bit permutation, wherein each layer of the Fourier transform performs two times of serial packeting and then butterfly operation on the input data, to output a product of the last butterfly operation output data and a twiddle factor to a next layer of the Fourier transform, an operational equation of the FFT module is as follows:

$$(k_1+2k_2+4k_3)=\sum_{n_3=0}^{\frac{N}{4}-1}\left\{\left[x(n_3)+(-1)^{k_1}x\left(\frac{N}{2}+n_3\right)\right]+(-j)^{(k_1+2k_2)}\left[x\left(\frac{N}{4}+n_3\right)+(-1)^{k_1}x\left(\frac{3N}{4}+n_3\right)\right]\right\}W_N^{n_3(k_1+2k_2)}W_{\frac{N}{4}}^{n_3k_3}$$

wherein $(k_1+2k_2+4k_3)$ is a sequence of output signals, $k_1$ is 0, 1, k2 is 0, 1, and k3 is an integer number ranging from 0 to 63;

a Mel filtration module that is a software component for performing a Mel filtration operation on a frequency-domain signal of each frame by extracting an energy value of a complex output by the FFT module and performing multi-stage Mel filtration on the energy value to obtain a Mel value;

a logarithm taking module that is a software component for performing compressed representation on data of filter sets by taking a logarithm value on the Mel value with 2 as a base through a lookup table; and a DCT module that is a software component for performing DCT on the logarithm value of the Mel value with 2 as the base by multiplying the input data and a cosine coefficient, the DCT module as butterfly operations are specific to the FFT module;

wherein performing butterfly operation on the input data packet by packet by each layer of the Fourier transform comprises setting a high-bit part of the input data as a first data set, setting a low-bit part of the input data as a second data set, performing the first butterfly operation on the first data set and the second data set, then updating the first data set to be a low-bit data of a first butterfly operation result, packeting the first butterfly operation result, then performing the second butterfly operation, and outputting a second butterfly operation result;

the FFT module comprises N/2 radix-$2^2$ single delay feedback units sequentially connected in series, N=$\log_2$T, T being the number of data contained in each frame of the speech sequence, and each radix-$2^2$ single delay feedback unit comprising:

a first butterfly operation unit and a storage unit thereof, wherein an input end of the first butterfly operation unit is connected to the speech sequence subjected to the framing and windowing operation or output data of the previous radix-$2^2$ single delay feedback unit, the high-bit part of the input data is cached in the storage unit of the butterfly operation unit, the high-bit part and the low-bit part of the input data are subjected to the first butterfly operation, then the data in the storage unit of the butterfly operation unit is updated to be the low-bit part of the first butterfly operation result, and a high-bit part of the first butterfly operation result is output to a second butterfly operation unit;

the second butterfly operation unit and a storage unit thereof, wherein the high-bit part of the input data is cached in the storage unit of the butterfly operation unit, the high-bit part and the low-bit part of the input data are subjected to the second butterfly operation, then the data in the storage unit of the butterfly operation unit is updated to be a low-bit part of the second butterfly operation result, and the second butterfly operation result is output to a multiplying unit; and the multiplying unit for performing a multiplication on the result of the second butterfly operation and the twiddle factor.

2. The serial FFT-based low-power MFCC speech feature extraction circuit according to claim 1, wherein preprocessing the input speech sequence by the pre-emphasis module specifically comprise subtracting a previous time data from a current time data of the input speech sequence and then accumulating a value acquired by shifting the previous time data rightwards by 4 bits so as to acquire a preprocessed speech signal.

3. The serial FFT-based low-power MFCC speech feature extraction circuit according to claim 1, wherein performing multi-stage Mel filtration on the energy value to obtain a Mel value specifically comprises performing multiplication-accumulation on the energy value and a function value of a multi-stage Mel filter.

4. The serial FFT-based low-power MFCC speech feature extraction circuit according to claim 1, wherein taking the logarithm value on the Mel value with 2 as the base though the lookup table specifically comprises taking a digit, where the highest bit "1" appears, of the Mel value as the logarithm value with 2 as the base.

5. The serial FFT-based low-power MFCC speech feature extraction circuit according to claim 1, wherein performing DCT on the logarithm value of the Mel value with 2 as the base specifically comprises multiplying the logarithm value of the Mel value with 2 as the base and a cosine coefficient and then performing accumulation.

* * * * *